(12) United States Patent
Hamlett et al.

(10) Patent No.: US 7,020,843 B2
(45) Date of Patent: Mar. 28, 2006

(54) METHOD AND SYSTEM FOR IMPLEMENTING A BROWSER OBJECT CONTAINER

(75) Inventors: Timothy Hamlett, Jacksonville, FL (US); Robert Umbehant, Ponte Vedra Beach, FL (US); Linda Wetzel Crofton, Jacksonville, FL (US)

(73) Assignee: UHC LLC, Jacksonville, FL (US)

( * ) Notice: Subject to any disclaimer, the term of this patent is extended or adjusted under 35 U.S.C. 154(b) by 168 days.

(21) Appl. No.: 10/622,449

(22) Filed: Jul. 21, 2003

(65) Prior Publication Data

US 2004/0243818 A1 Dec. 2, 2004

Related U.S. Application Data

(63) Continuation-in-part of application No. 09/450,557, filed on Nov. 30, 1999, now Pat. No. 6,606,103.

(51) Int. Cl.
*G06F 3/00* (2006.01)
(52) U.S. Cl. ............... 715/760; 715/748; 709/217; 709/219
(58) Field of Classification Search ............... 715/742, 715/741, 743, 744, 760, 513, 748; 709/203; 713/152, 200, 201, 202
See application file for complete search history.

(56) References Cited

U.S. PATENT DOCUMENTS

| | | | |
|---|---|---|---|
| 4,642,625 A | 2/1987 | Tsunehiro et al. | 345/441 |
| 4,736,330 A | 4/1988 | Capowski | 345/501 |
| 4,800,510 A | 1/1989 | Vinberg et al. | 345/440 |
| 4,808,988 A | 2/1989 | Burke et al. | 345/16 |
| 5,243,447 A | 9/1993 | Bodenkamp et al. | 345/629 |
| 5,289,205 A | 2/1994 | Torres | 345/685 |
| 5,469,189 A | 11/1995 | Noguchi et al. | 345/620 |
| 5,642,476 A | 6/1997 | Turner | 345/443 |
| 5,659,674 A | 8/1997 | Doyle et al. | 345/619 |
| 5,721,853 A | 2/1998 | Smith | 715/803 |
| 5,801,688 A | 9/1998 | Mead et al. | 715/700 |
| 5,838,321 A | 11/1998 | Wolf | 715/803 |
| 5,845,058 A | 12/1998 | Shaw et al. | 358/1.15 |
| 5,867,633 A | 2/1999 | Taylor, III et al. | 358/1.9 |
| 5,877,963 A | 3/1999 | Leung et al. | 700/223 |
| 5,881,213 A | 3/1999 | Shaw et al. | 358/1.15 |

(Continued)

FOREIGN PATENT DOCUMENTS

| | | |
|---|---|---|
| JP | 2203392 | 8/1990 |
| JP | 2303490 | 6/1992 |

OTHER PUBLICATIONS

"Amazing Planet," *Internet Service*, http://www.amazing-planet.com/.

*Primary Examiner*—Kieu D Vu
(74) *Attorney, Agent, or Firm*—Hunton & Williams LLP

(57) ABSTRACT

A method and system for implementing a browser object container is disclosed. In one exemplary embodiment, a method for implementing a browser object container comprises the steps of identifying content data for inclusion in a browser object container; defining one or more navigation options for defining how one or more recipients view the content data as provided by the browser object container; adding the content data with the one or more navigation options to the browser object container; compressing the content definition into a compressed file; encrypting the compressed file into an encrypted file; and electronically transmitting the browser object container wherein the one or more recipients navigate through the content data as allowed by the one or more navigation options within the browser object container.

22 Claims, 11 Drawing Sheets

U.S. PATENT DOCUMENTS

| | | | |
|---|---|---|---|
| 5,896,121 A | 4/1999 | Kafer | 345/589 |
| 5,896,499 A * | 4/1999 | McKelvey | 713/201 |
| 5,974,181 A | 10/1999 | Prieto | 382/232 |
| 5,983,190 A | 11/1999 | Trower, II et al. | 704/276 |
| 6,057,854 A | 5/2000 | Davis, Jr. et al. | 345/619 |
| 6,286,029 B1 * | 9/2001 | Delph | 709/203 |
| 6,363,392 B1 * | 3/2002 | Halstead et al. | 707/102 |
| 6,802,013 B1 * | 10/2004 | Follendore, III | 713/201 |

* cited by examiner

METHOD AND SYSTEM FOR IMPLEMENTING A BROWSER OBJECT CONTAINER

CROSS-REFERENCE TO RELATED APPLICATIONS

This patent application is a continuation in part of U.S. patent application Ser. No. 09/450,557, filed Nov. 30, 1999, now U.S. Pat. No. 6,606,103, which is hereby incorporated by reference herein it its entirety.

FIELD OF THE INVENTION

The present invention relates generally to implementing browser objects, and more particularly, to a method and system for transmitting various types of content data through a defined browser object container where recipients are able to navigate through the content data as provided by the browser object container.

BACKGROUND OF THE INVENTION

The amount and quality of information available on the Internet has developed and expanded enormously. With the wealth of information comes the need to effectively share the information with others. Currently, if a user wants to share information from a website or web page, the user will send links or single web pages via email. However, as web sites often update information and constantly change the look and feel of the web site, recipients are never guaranteed to receive the exact information intended when accessed at a later time. Further, it is oftentimes burdensome and tedious to send more than one web page at a time to a recipient due to the large amount of data. Further, security concerns and authenticity of information are also factors that may impede effective communication of information. In addition, the recipient may easily wander off the intended web page to information that may be irrelevant and at times misleading. Thus, there is currently no mechanism to ensure that what the user will view is the correct information.

In view of the foregoing, it would be desirable to provide a technique for providing content data through the use of a browser object container which overcomes the above-described inadequacies and shortcomings.

SUMMARY OF THE INVENTION

According to an embodiment of the present invention, a method and system transmits various types of content data through a defined browser object container where recipients are able to navigate through the content data as provided by the browser object container. According to an exemplary embodiment of the present invention, a method for implementing a browser object container comprising the steps of identifying content data for inclusion in a browser object container; defining one or more navigation options for defining how one or more recipients view the content data as provided by the browser object container; adding the content data with the one or more navigation options to the browser object container wherein the content data and the one or more navigation options are embedded into a content definition; compressing the content definition into a compressed file; encrypting the compressed file into an encrypted file for securing the content data; and electronically transmitting the browser object container containing the compressed and encrypted file to the one or more recipients wherein the one or more recipients navigate through the content data as allowed by the one or more navigation options within the browser object container.

According to other aspects of this particular exemplary embodiment of the present invention, in the method described above, the content data comprises a plurality of web pages, picture files, PDF documents and flash files; the content data is transmitted via one or more of network computer, email, PDA and mobile phone; the browser object container is a stand-alone executable operating locally but giving an appearance of being connected to the Internet; the content data comprises a plurality of web pages from one or more web sites; a browser interface of the browser object container is defined by the user; the method further comprises the steps of assigning multiple levels of encryption to content data for enabling multiple levels of access to the one or more recipients; at a recipient end of the one or more recipients, the method further comprises the steps of receiving the browser object container containing the compressed and encrypted file; decrypting the encrypted file; decompressing the compressed file; and viewing the content data via the browser object container as allowed by the navigation options; the content data comprises a plurality of embedded data files; the embedded data files comprises an entire website; and the method further comprises the step of enabling the one or more recipients to access web pages available on the Internet without an Internet connection.

According to another exemplary embodiment of the present invention, a system for implementing a browser object container comprises an identifying means for identifying content data for inclusion in a browser object container; a navigation means for defining one or more navigation options for defining how one or more recipients view the content data as provided by the browser object container; an add content means for adding the content data with the one or more navigation options to the browser object container wherein the content data and the one or more navigation options are embedded into a content definition; a compressing means for compressing the content definition into a compressed file; an encryption means for encrypting the compressed file into an encrypted file for securing the content data; and a transmission means for electronically transmitting the browser object container containing the compressed and encrypted file to the one or more recipients wherein the one or more recipients navigate through the content data as allowed by the one or more navigation options within the browser object container.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modification, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
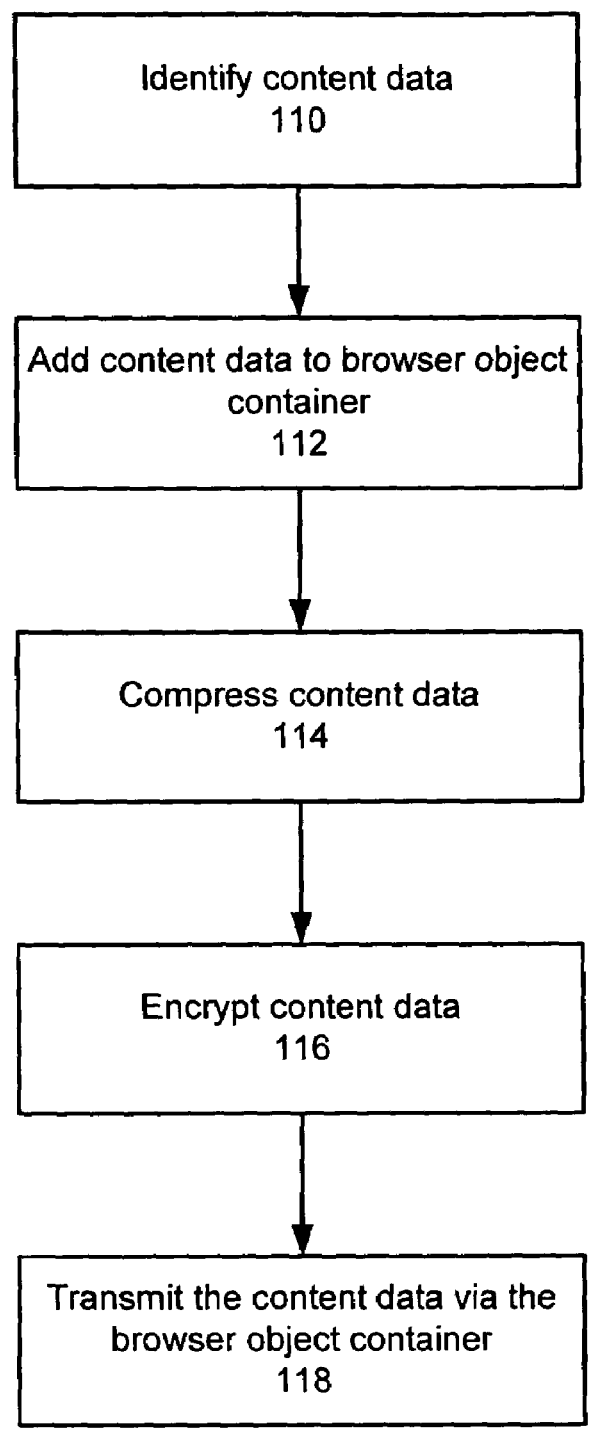
FIG. 1 is a flowchart illustrating a method for generating a browser object container, in accordance with an embodiment of the present invention.

According to an embodiment of the present invention, a method and a system are directed to transmitting various types of content data through a defined browser object container where recipients are able to navigate through the content data as provided by the browser object container.

The browser object container of an embodiment of the present invention involves a graphical user interface (GUI) development platform which provides a purpose-built Internet browser that may be activated by an Internet Explorer (IE) plug-in. Purpose-built browsers may contain any, all or none of the common browser navigation controls depending on the level of user flexibility desired by the designer. The browser object container may include compressed and encrypted (e.g., up to 2048 bit) design files. Further, the browser object container may include any and all types of embedded data files including entire websites and/or any other browser compatible content. In addition, the browser object container may be made into stand-alone executables giving an appearance of being connected to the Internet while operating locally.

The browser object container may include a self contained modular file structure; file data compressed and streamable; a file containing complete GUI definition; support of various conventional encryption standards (e.g., AES, DES, PK, etc.); MD5 hash to ensure data integrity; error detection and recovery and/or other various functions and features.

According to an example of an embodiment of the present invention, the browser object container may encapsulate an entire user interface, including web documents, pictures, and/or other files (e.g., PDF documents, flash files, etc.) into a single platform independent file. The user interface may be fully scaleable for use on an array of different display resolutions. The file may be compressed to ensure efficiency. MD5 hash or other security mechanisms may be used to maintain data integrity. File specification associated with the browser object container may be platform independent for display on various systems, such as Windows™, Windows CE™, Linux™, etc. In addition, the code for the browser object container may be written with as little Graphic Device Interface (GDI) dependence as possible thereby allowing for use of multiple devices. File format of the browser object container may use tagged data to ensure that enhancements will not 'break' previous versions. Tagged data may be identified by type with an application executing only those types of tagged data that are capable of acting upon. Hence, new features which may be identified by new tags will not attempt to execute on older applications. The file format may be streamable for faster data access over the web. Automatic data recovery features are also available in the event of file damage or other similar event.

Various types of encryption may include AES (e.g., RC6, MARS, Twofish, Serpent, CAST-256, etc), DES (e.g., IDEA, DES, Triple DES (DES-EDE2 and DES-EDE3, etc.), DESX (DES-XEX3), RC2, RC5, Blowfish, Diamond2, TEA, SAFER, 3-WAY, GOST, SHARK, CAST-128, Square, Skipjack; PK (e.g., RSA, DSA, ElGamal, Nyberg-Rueppel (NR), Rabin, etc.); Rabin-Williams (RW), LUC, LUCELG, DLIES (variants of DHAES), ESIGN and others.

FIG. 1 is a flowchart illustrating a method for generating a browser object container, in accordance with an embodiment of the present invention. At step 110, content data may be identified. Content data may include a variety of data, including web pages, an entire web site, animation files, sound files, PDF files, documents, drawings, presentations, applications, directory structures, etc. In addition, navigation capabilities available to the intended recipients may be identified by the designer. For example, the designer may define how the recipients can view and/or navigate through the content data provided by the browser object container. In another example, varying levels of access for different recipients may be assigned to the content data. For example, certain recipients may have access to certain data while other recipients may have access to other portions of the content data. At step 112, the identified content data may be added to a browser object container of an embodiment of the present invention. At step 114, the content data may be compressed. At step 116, the compressed content data may be encrypted. At step 118, the content data may be transmitted to one or more recipients via the browser object container.

According to an embodiment of the present invention, a designer (or other user) may add a wide range of content data into a browser object container with defined navigation and/or viewing options for the recipients. The content data may be compressed and encrypted to facilitate delivery and ensure security.

Figure 2:
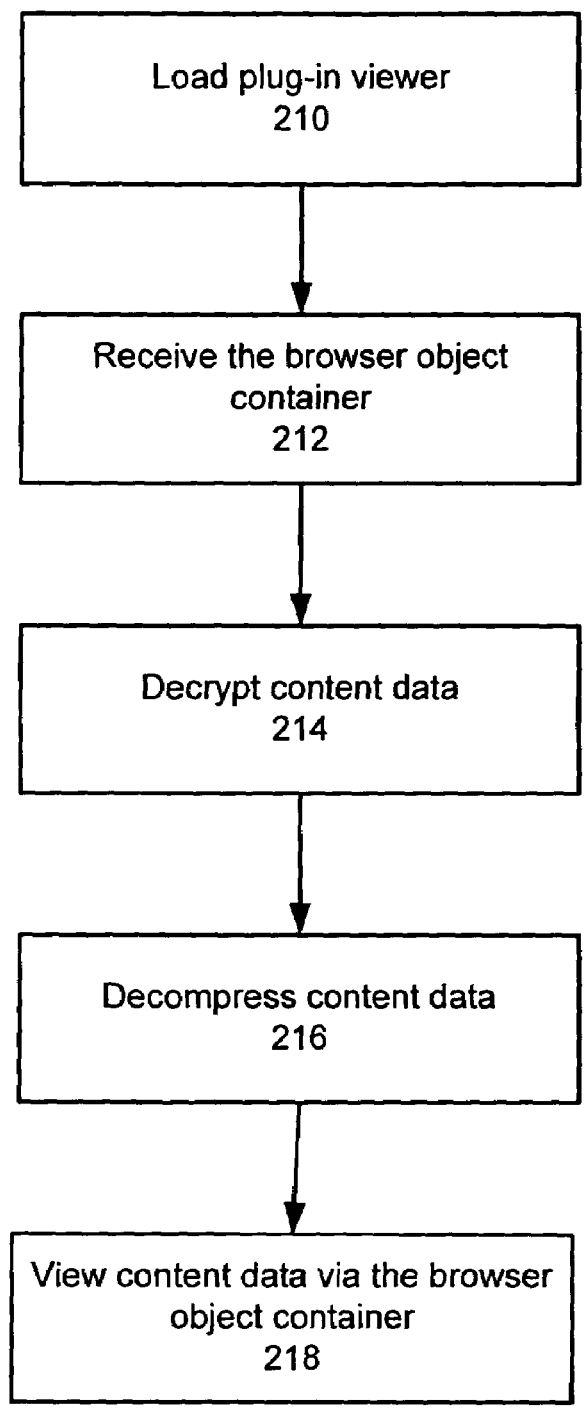
FIG. 2 is a flowchart illustrating a method for receiving a browser object container, in accordance with an embodiment of the present invention.

FIG. 2 is a flowchart illustrating a method for receiving a browser object container, in accordance with an embodiment of the present invention. At step 210, a user may load a plug-in viewer. At step 212, the browser object container may be received by the user. Various modes of communication may be used, such as Internet, email, PDA, mobile phone or other receiver. At step 214, the content data may be decrypted. At step 216, the content data may be decompressed. At step 218, the content data may be accessed by the user via the browser object container where the content data may be viewed, as defined by navigation options provided by the designer.

Figure 3:
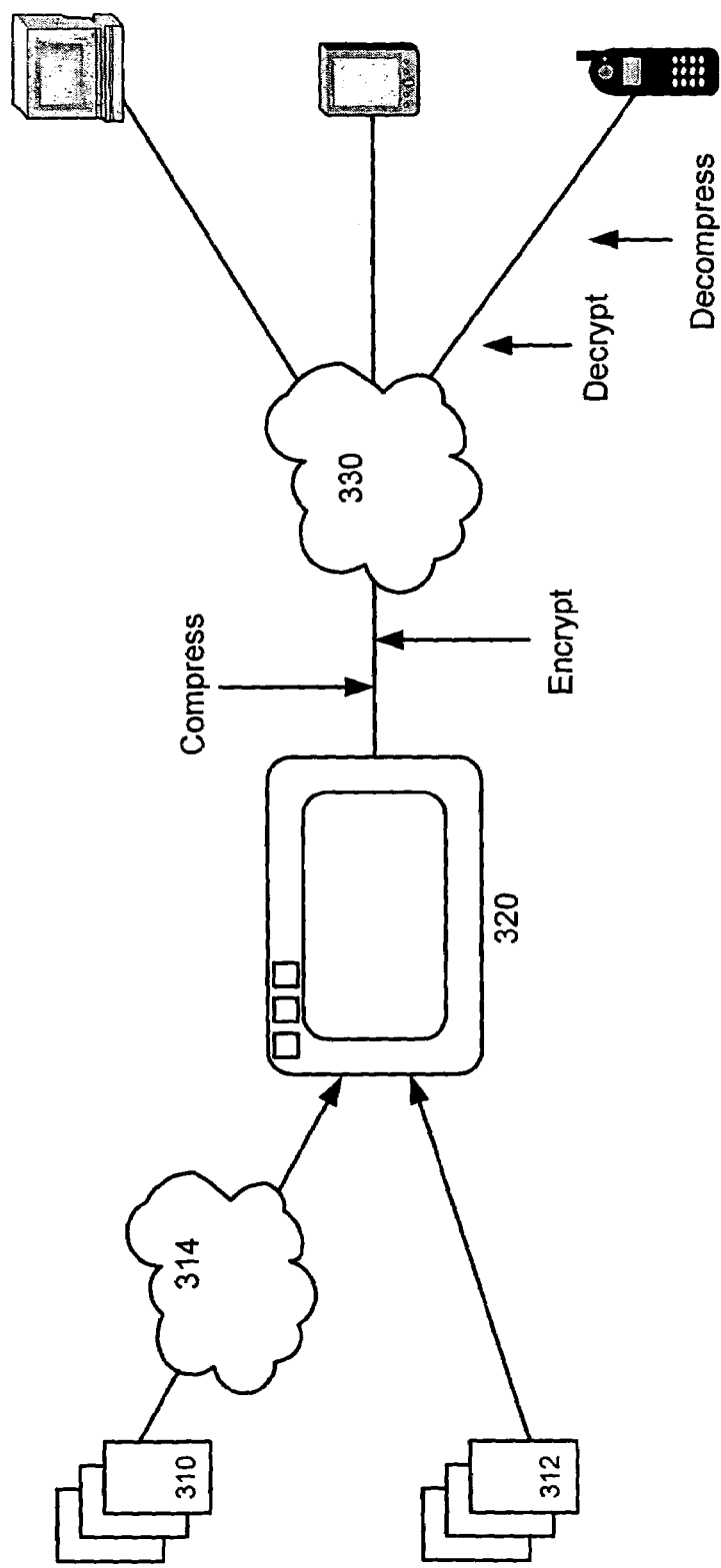
FIG. 3 is a system for implementing a browser object container, in accordance with an embodiment of the present invention.

FIG. 3 is a system for implementing a browser object container, in accordance with an embodiment of the present invention. A user may identify various forms of data to be included in a browser object container 320 of an embodiment of the present invention. For example, data 310 may represent web pages and other types of data accessible via the Internet 314 or other network. Data 312 may represent files, such as PDF files, flash files, animation files, sound files and other data. The browser object container 320 containing the user selected (or user defined) data may be compressed and encrypted before being electronically transmitted. In this example, the browser object container 320 may be transmitted via the Internet 330 or other network, including wireless phone network, etc. At the receiving end, as shown by computer 340, PDA 342 and mobile phone 344, the content data in the browser object container 320 may be decrypted and decompressed. The user may then access the content data through the browser object container 320 while staying within the limits of the browser object container as specified by the designer.

Figure 4:
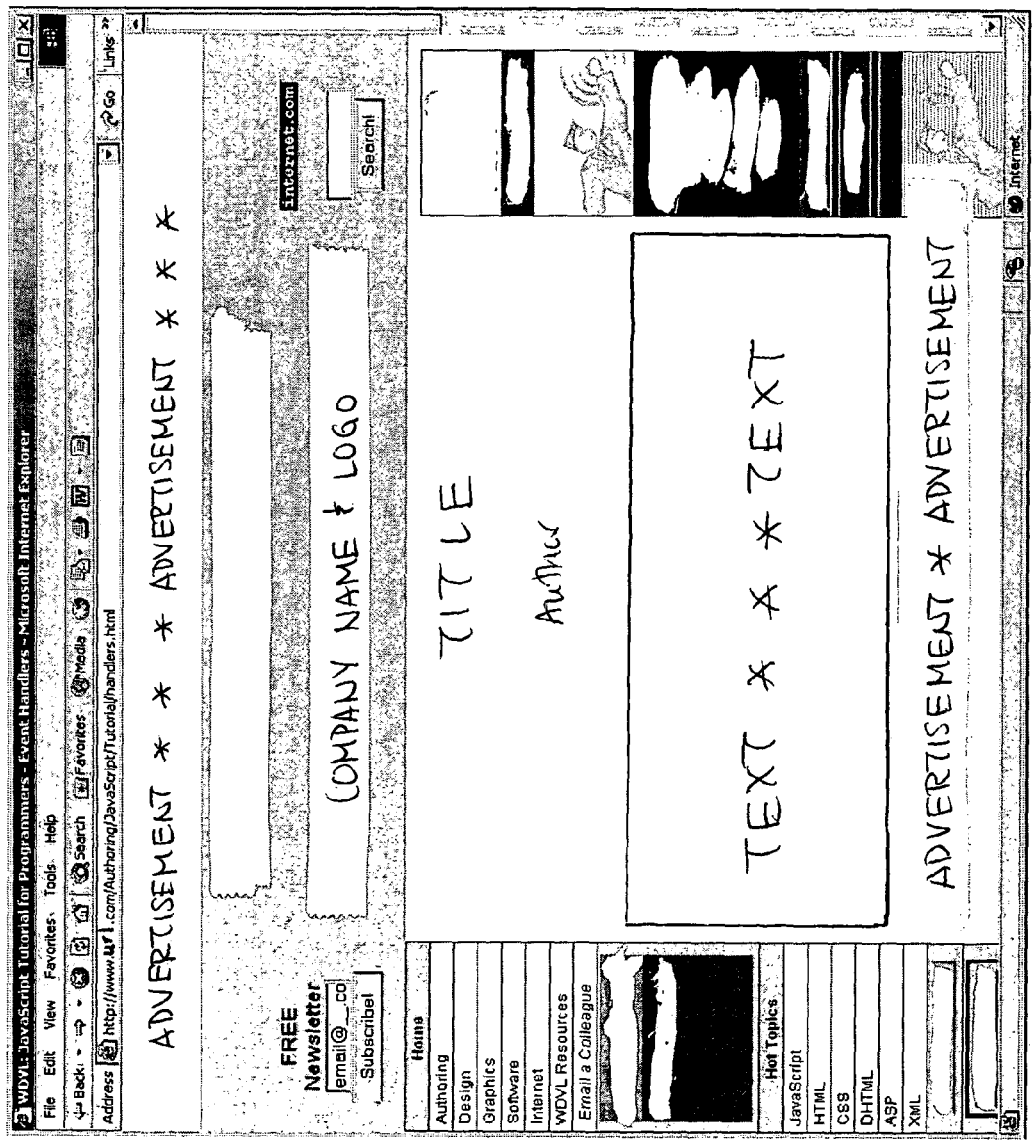
FIG. 4 is an example of a conventional web page and FIG. 5 is an example of the web page within the browser object container of an embodiment of the present invention.
Figure 5:
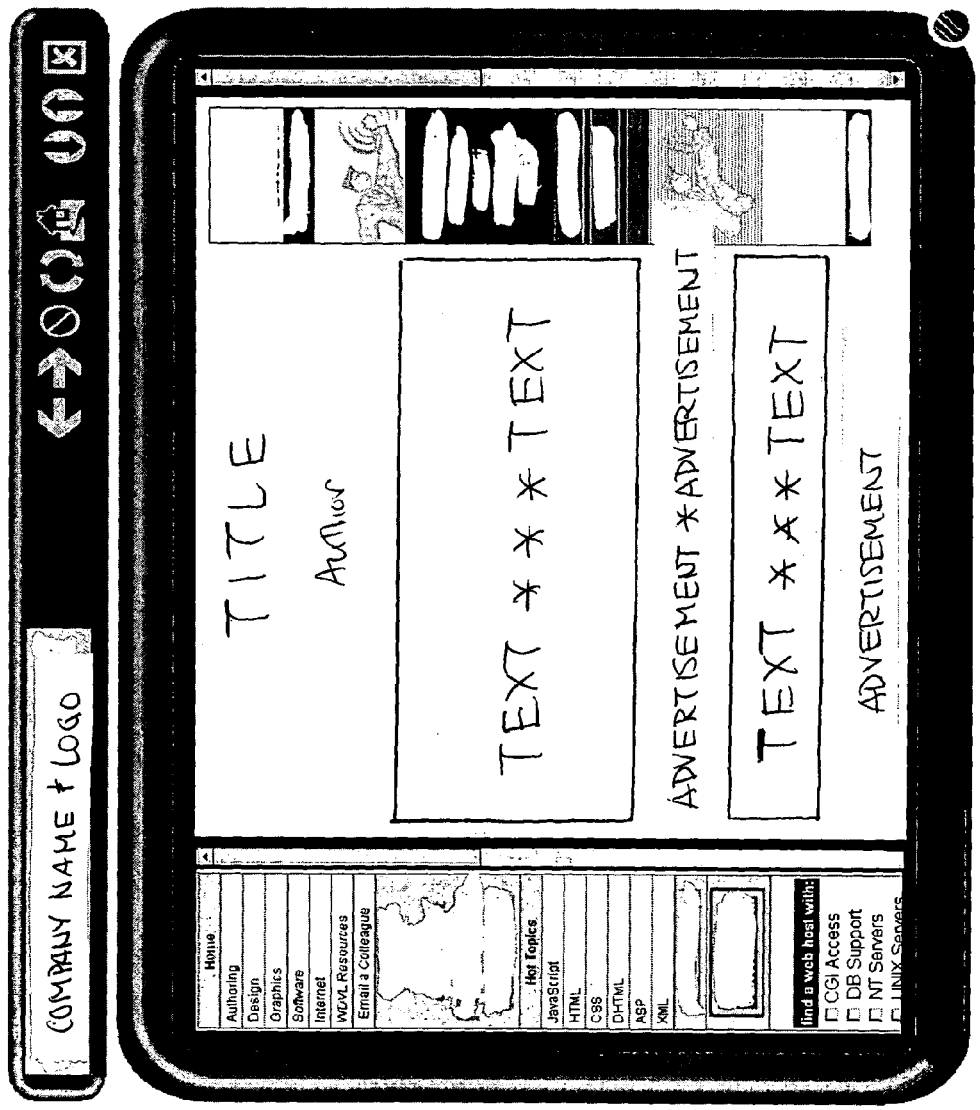

FIG. 4 is an example of a conventional web page and FIG. 5 is an example of the web page within the browser object container of an embodiment of the present invention. The browser object container may include various types of embedded data files including entire websites and/or any other browser compatible content. The browser object container may be made into stand-alone executables giving the appearance of being connected to the Internet but operating locally. The browser object container may provide a high level of design flexibility. As shown in FIG. 5, standard console controls are missing by design. As there is no address "go to" input box, the browser is unable to wander beyond the limits of the site or page becoming, in effect, a closed system. Thus, designers may specify any degree of flexibility or access rights in a browser object container design definition.

The browser object container design definitions may pack a visual wallop with little additional overhead. For example, the browser object container illustrated in FIG. 5 weighs in at approximately 17k, about the size of a small GIF button image. The definition file and any embedded content may be compressed and encrypted where any tampering will produce a non-operable file. If even 1 byte is altered, the browser object container will not execute to ensure high data authenticity.

The browser object container may function locally or within a network—the choice may be up to the designer. A feature of the browser object container may include the ability to embed content, even entire websites, right into the design file. Many times highly compressed content (e.g., JPG, PDF, etc.) may be squeezed another 15–20%. Thus, the embedded content may be encrypted and become part of the browser object container definition. Another feature includes the ability to create stand-alone executables. This feature allows the designer (e.g., user, content provider, etc.) to distribute purpose-built browser object container applications via various forms of communication, including email, CD-ROM, FTP, etc., and have critical data accessible to recipients (e.g., clients) even when the recipient is offline.

Browser object containers may include a GUI development platform which provides purpose-built Internet browsers that recipients may activate by a plug-in. Purpose-built Internet browsers may contain any, all or none of the common browser navigation controls—depending on the level of user flexibility desired by the designer.

Figure 6:
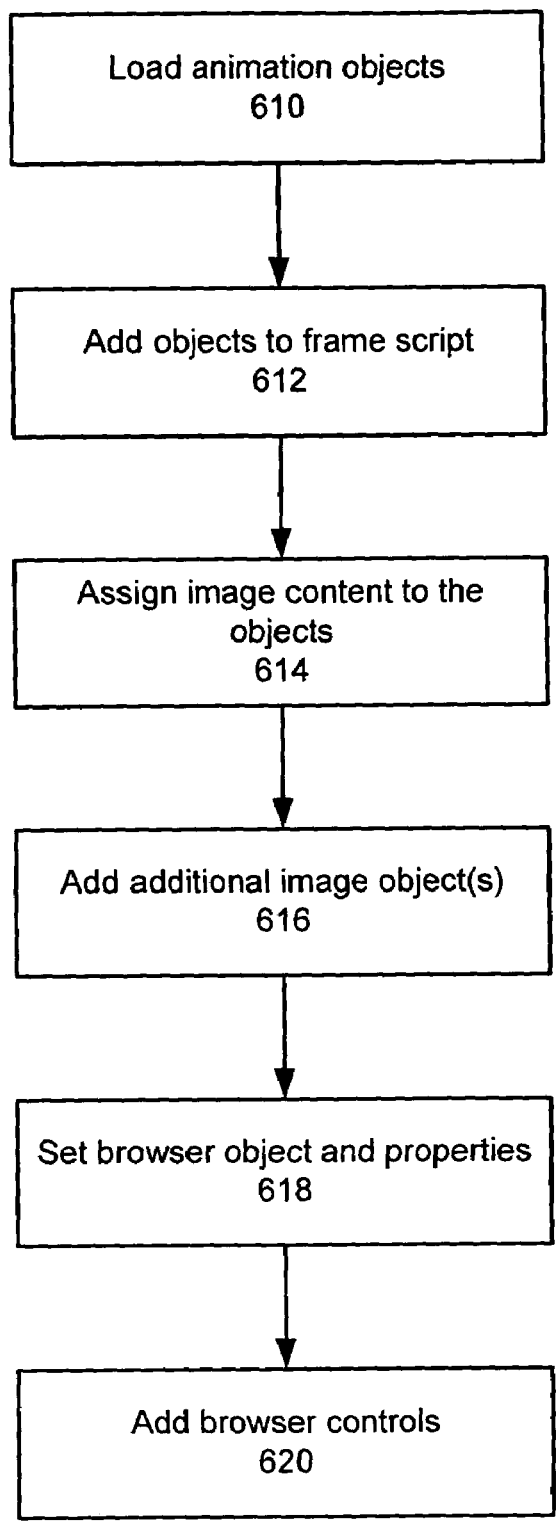
FIG. 6 is a flowchart illustrating a method for creating a browser object container, according to an embodiment of the present invention.

FIG. 6 is a flowchart illustrating a method for creating a browser object container, according to an embodiment of the present invention. At step 610, objects may be loaded. The objects may include animation and/or other objects. At step 612, the objects may be added to a frame script. At step 614, image content may be assigned to the objects. At step 616, other additional objects, including image, animation and/or other objects may be added. At step 618, a browser object and other properties may be determined. At step 620, browser controls may be added.

Figure 7:
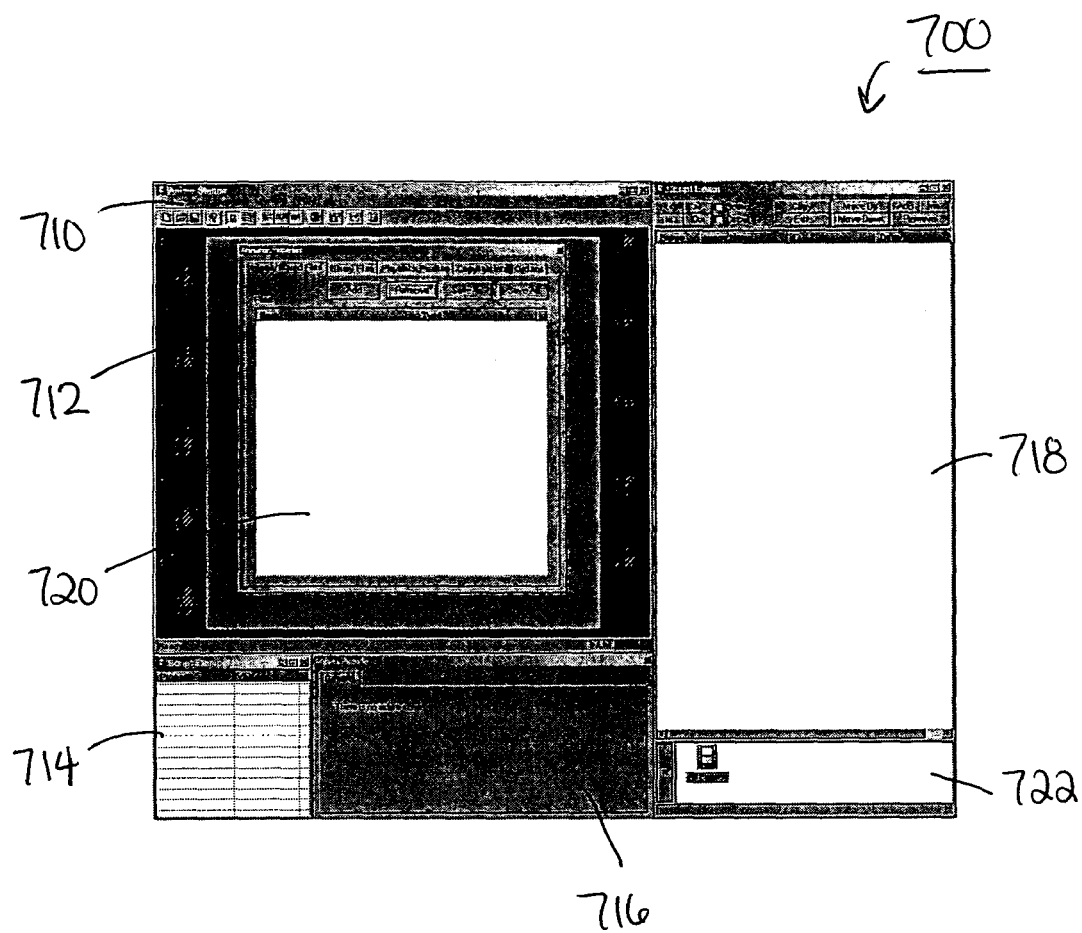
FIG. 7 is an illustration of an interface for designing a browser object container, in accordance with an embodiment of the present invention.

FIG. 7 is an illustration of an interface for designing a browser object container, in accordance with an embodiment of the present invention. The design interface 700 provides an editor 710, animation properties screen 712, an object ambient properties list 714, an ambient properties screen 716, and a script editor 718. Object Bank 720 is a repository for various images, sounds and sub-animations and Frame Map 722 displays a thumbnail view of each frame.

Figure 8:
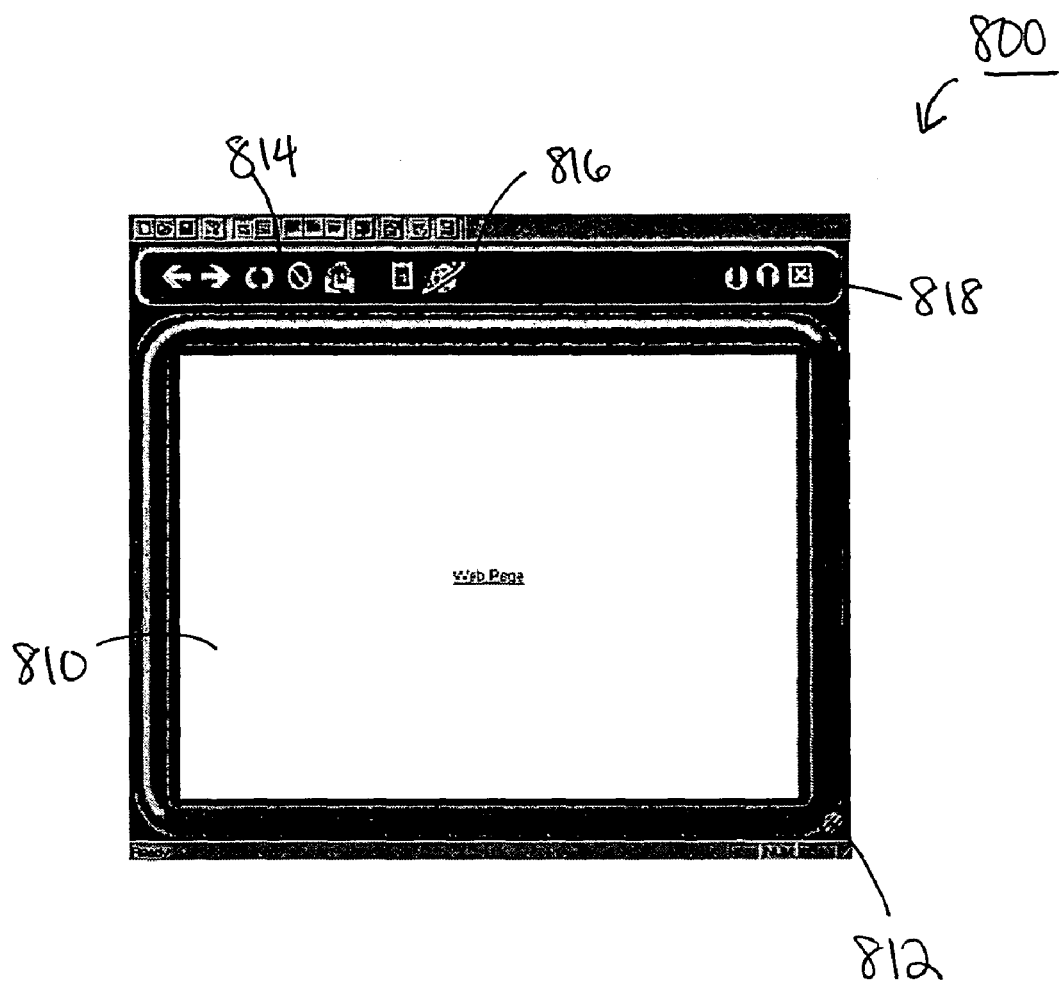
FIG. 8 is an example of a browser object container, in accordance with an embodiment of the present invention.

FIG. 8 is an example of a browser object container, in accordance with an embodiment of the present invention. Browser object container 800 provides content data to a recipient, as defined by the designer. In this example, browser component 810 may include an Active-X™ control and automatically provide the capabilities of Internet Explorer to the browser object container. Re-size handle area 812 represents a defined interactive area that enables the viewer to size the browser object container. Navigation controls 814 may provide back, forward, stop, refresh and home controls. Custom navigation controls 816 may include a surface image selector which links to a pre-selected web site, for example. Standard application controls 818 may include controls such as minimize, maximize and exit.

Many different controls may be accommodated to create a browser object container. In this particular example, there is no access to extended navigational features of Internet Explorer, such as a Favorites list and a URL address line. In essence, the browser object container may represent a custom environment wrapper that may be generated on a page by page basis while the user is within the confines of the defined site. On exit from the defined site, the browser object container evaporates restoring the original Explorer referring page and allowing the user to interact with a conventional browser intact.

Figure 9:
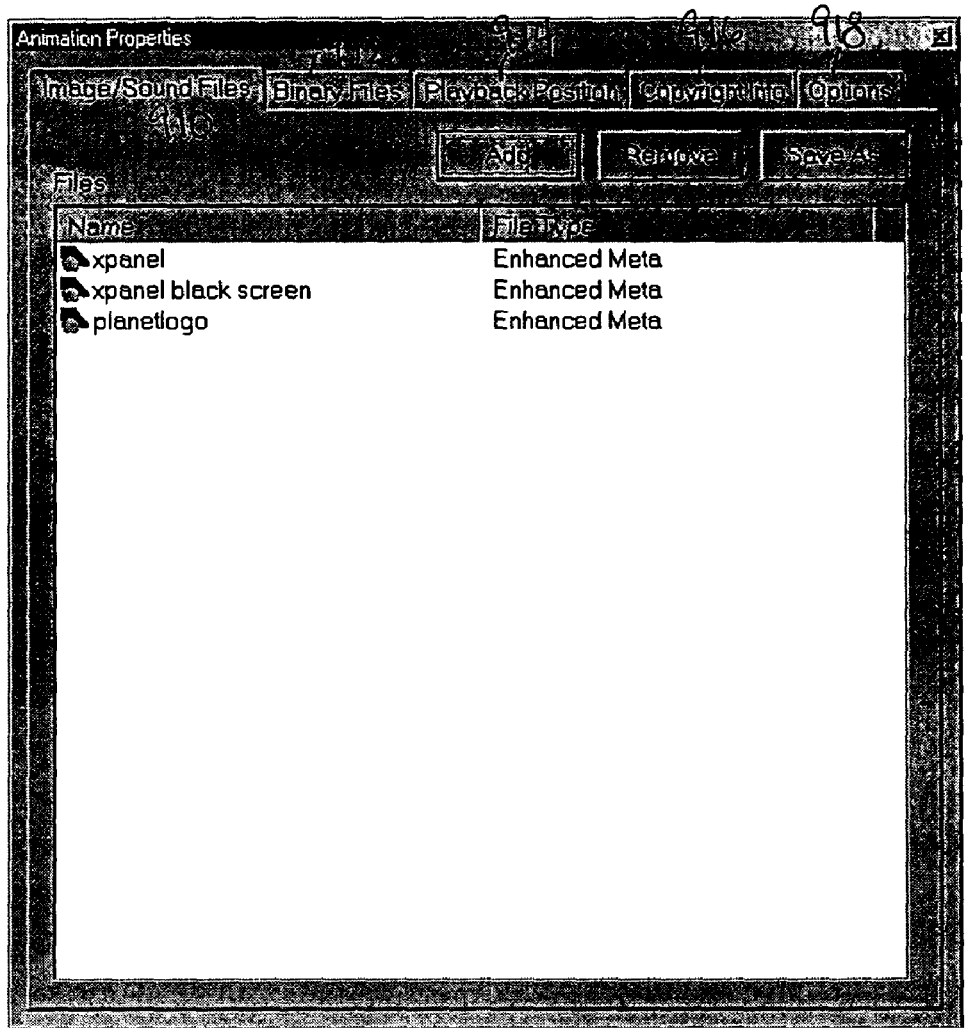
FIG. 9 is an example of an animation properties screen, in accordance with an embodiment of the present invention.

FIG. 9 is an example of an animation properties screen, in accordance with an embodiment of the present invention. The animation properties screen 712 of FIG. 7 is shown in more detail as 900. Image/Sound files 910 may allow a designer to add, remove and/or save files, such as image, sound and/or other files. In this example, three images may be used to create a browser object container. The images may be listed by file name and file type. Image objects may be listed in order of loading and list entries may include type icon, object name (e.g., file name) and detailed file type description. Other different type icons may include vector images, raster images, sounds and sub-animations which may represent external resources (as well as PAINT and BROWSER) which may be generated by a script editor. Other files may include binary files 912. Playback position 914, copyright information 916 and other options 918 may also be provided.

The size and position of the browser object container may be defined. By selecting the playback position 914 tab, playback window size (e.g., full screen, 75%, 50%, 25%, 10%, user percentage, etc.) and playback position (e.g., center, upper left, upper right, lower left, lower right, user percent offset, etc.) may be selected. A universal sizing feature of an embodiment of the present invention sizes a browser object container as a percentage of screen size, regardless of the screen resolution. In other words, a browser object container defined as 50% window size will appear as 50% of the screen size.

The Options 918 tab enables a designer to set pop-up and/or other options. For example, a playback in popup window option may display the browser object container in a floating, positionable window. In another example, a playback in topmost window option brings the browser object container to the top of the desktop Z order (or other order of appearance of imagery on a display screen). Other options may include show controls window, attach controls window, show splash box, cutout all images, always paint background, play back speed percentage, global link, background window, etc. Other options useful in making other types of animation may also be included.

Figure 10:
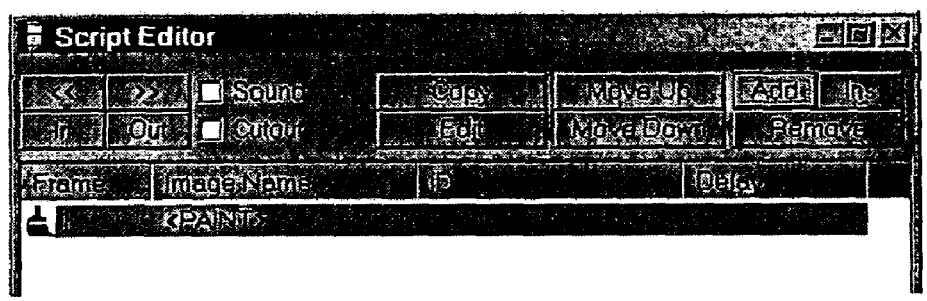
FIG. 10 is an example of a script editor, in accordance with an embodiment of the present invention.

Objects may then be added to a frame script through a script editor. FIG. 10 is an example of a script editor, in accordance with an embodiment of the present invention. Script Editor 1000 is an example script editor 718 of FIG. 7. In this example, a PAINT object has been added to the script editor. A cutout option allows the shape to be extruded from the designated image object. By selecting the add button, a frame has been created in the browser object container.

Figure 11:
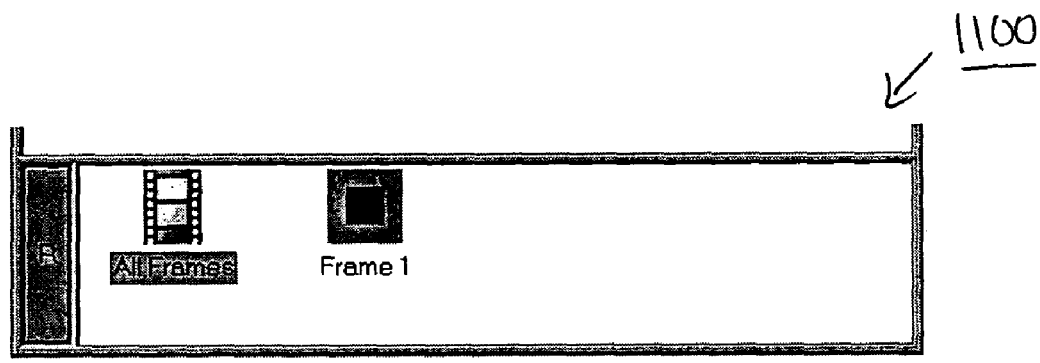
FIG. 11 is an example of a frame map view, in accordance with an embodiment of the present invention.

FIG. 11 is an example of a frame map view, in accordance with an embodiment of the present invention. Frame map 1100 is an example of frame map 722 in FIG. 7. After a frame has been created and added to script editor 1000, a new frame will appear in the Frame Map 1100.

address may be entered. Browser controls may be added to a browser window embedded into the browser object container. In this example, text content may be assigned to an object for providing control features.

According to an example, the browser object container may be web enabled and require an Internet connection. In another example, the browser object container may function locally without an Internet connection. The browser object container may be deployed in a variety of ways. One exemplary use is as a page generated site browser. Another exemplary use may include a stand-alone emailed or downloaded executable site browser. For example, through an embodiment of the present invention, one user may email another user a web site in a (e.g., 150 kb) browser object container.

An embodiment of the browser object container may function as a highly efficient and compact animation file through the use of a web projector control. The web projector may be a Windows Active-X control embedded in a web page as a visible projection surface or as a hidden user or conditionally activated pop-up window. The web projector may interpret the tagged data and execute per the data tag characteristics.

The following HTML code describes an exemplary object, in accordance with an embodiment of the present invention.

```
<object id="Ani" classid="clsid:A1B624AF-EA23-11D3-9EE4-444553540000"
codebase="http://www.uhcllc.com/as/anm/AsAnm.ocx" border="0" width="1"
height="1"><param name="bHideParent" value="1"><param name="bRestoreParent"
value="1"><param name="rgbColor" value="255,255,255"> </object>
```

Figure 12:
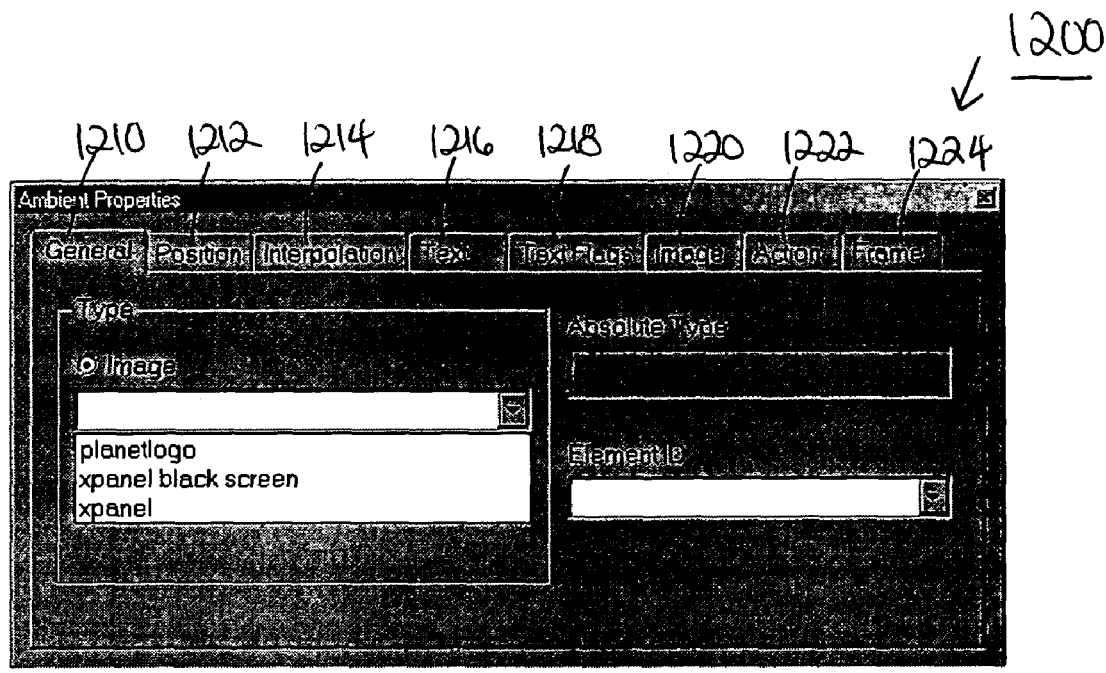
FIG. 12 is an example of an ambient properties screen 1200, in accordance with an embodiment of the present invention.

Image content may be assigned to the object (e.g., the PAINT object). FIG. 12 is an example of an ambient properties screen 1200, in accordance with an embodiment of the present invention. FIG. 12 is shown as 716 in FIG. 7. By selecting a General 1210 tab, content may be assigned to an image. In this example, an image may be selected from an drop down menu. Other options include Position 1212, Interpolation 1214, Text 1216, Text Flags 1218, Image 1220, Action 1222 and Frame 1224.

Position 1212 tab provides adjustment of the image object size and position. By selecting the Position 1212 tab, values for left, top, width and height may be defined. For example, in the case of width and height, a zero value indicates a full frame image. By selecting Image 1220 tab, provides object size and position, as well as translucency percentage may be defined.

Additional image objects may be selected through the scrip editor 1000 as discussed above. Image content may be assigned to the new object through ambient properties screen 1200 as discussed above. Image object size and position may be adjusted through the position tab 1212 of the ambient properties screen 1200. Next, image transparency and other properties may be set through the image tab 1220 of the ambient properties screen 1200. The process may be repeated for additional image objects.

A Browser object and associated properties may be determined. For example, objects (e.g., PAINT objects) may be assigned image content, text content and/or a browser window. According to an embodiment of the present invention, an object may be made into a browser window. Browser windows may be considered to be persistent objects and are not affected by object order. By selecting a browser tab from Ambient Properties screen, a browser start page URL where id is a web projector object name where the name may be programmer selectable and if more than one projector is required on a page, a different id may be used for each;

classid is a unique identifier for the object for differentiating versions;

codebase is a web location of the current version of the projector object;

width & height, in this case the values are set to 1 (pixel) since this object is used as an invisible control;

bHideParent is the switch (0=off, 1=on) that tells the web projector to minimize the referring web page on startup;

bRestoreParent is the switch (0=off, 1=on) that tells the web projector to restore the referring web page on shutdown; and rgbColor is the red, green & blue (RGB) values for the projector splash screen.

Other additional object parameters that may be useful may include:

bRun is the run switch (0=no, 1=yes);

bSilent is the splash screen visibility switch (0=no, 1=yes);

bSound is the audio switch (0=no, 1=yes);

strUrl is the URL address to be loaded;

dwVersion returns the version number of the web projector, the format is XXXXYYYY where X is the major version # and Y is the minor version # (e.g., v 1.2=12000);

dwCurrentFrame returns the current frame #; and dwFrames returns the number of frames.

The functionality associated with the browser object container, as discussed above, may be represented as software code and/or hardware structure. Further, the browser object container in accordance with the present invention as described above typically involves the processing of input data and the generation of output data to some extent. This input data processing and output data generation may be implemented in hardware or software. For example, specific electronic components may be employed in a hardware or similar or related circuitry for implementing the functions associated with browser object container in accordance with the present invention as described above. Alternatively, one or more processors operating in accordance with stored instructions may implement the functions associated with browser object container in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for implementing a browser object container, the method comprising the steps of:
    identifying content data for inclusion in a browser object container, wherein the browser object container comprises a graphical user interface development platform for providing a purpose-built Internet browser and wherein the browser object container comprises tagged data for enhancement integrity wherein at least one new feature identified by at least one new tag will not execute on an previous application;
    defining one or more navigation options for defining how one or more recipients view the content data as provided by the browser object container;
    adding the content data with the one or more navigation options to the browser object container wherein the content data and the one or more navigation options are embedded into a content definition;
    compressing the content definition into a compressed file;
    encrypting the compressed file into an encrypted file for securing the content data; and
    electronically transmitting the browser object container containing the compressed and encrypted file to the one or more recipients wherein the one or more recipients navigate through the content data as allowed by the one or more navigation options within the browser object container;
    wherein the browser object container is a stand-alone executable operating locally but giving an appearance of being connected to the Internet wherein the browser object container limits navigation through the content data within defined limits of the navigation options.

2. The method of claim 1, wherein the content data comprises a plurality of web pages, picture files, PDF documents and flash files.

3. The method of claim 1, wherein the content data is transmitted via one or more of network computer, email, PDA and mobile phone.

4. The method of claim 1, wherein the content data comprises a plurality of web pages from one or more web sites.

5. The method of claim 1, wherein a browser interface of the browser object container is defined by a user.

6. The method of claim 1, further comprising the steps of:
    assigning multiple levels of encryption to content data for enabling multiple levels of access to the one or more recipients.

7. The method of claim 1, wherein at a recipient end of the one or more recipients, further comprising the steps of:
    receiving the browser object container containing the compressed and encrypted file;
    decrypting the encrypted file;
    decompressing the compressed file; and
    viewing the content data via the browser object container as allowed by the navigation options.

8. The method of claim 1, wherein the content data comprises a plurality of embedded data files.

9. The method of claim 8, wherein the embedded data files comprises an entire website.

10. The method of claim 1, further comprising the step of:
    enabling the one or more recipients to access web pages available on the Internet without an Internet connection.

11. At least one processor readable carrier for storing a computer program of instructions configured to be readable by at least one processor for instructing the at least one processor to execute a computer process for performing the method as recited in claim 1.

12. A system for implementing a browser object container, the system comprising:
    an identifying means for identifying content data for inclusion in a browser object container, wherein the browser object container comprises a graphical user interface development platform for providing a purpose-built Internet browser and wherein the browser object container comprises tagged data for enhancement integrity wherein at least one new feature identified by at least one new tag will not execute on an previous application;
    a navigation means for defining one or more navigation options for defining how one or more recipients view the content data as provided by the browser object container;
    an add content means for adding the content data with the one or more navigation options to the browser object container wherein the content data and the one or more navigation options are embedded into a content definition;
    a compressing means for compressing the content definition into a compressed file;
    an encryption means for encrypting the compressed file into an encrypted file for securing the content data; and
    a transmission means for electronically transmitting the browser object container containing the compressed and encrypted file to the one or more recipients wherein the one or more recipients navigate through the content data as allowed by the one or more navigation options within the browser object container;
    wherein the browser object container is a stand-alone executable operating locally but giving an appearance of being connected to the Internet wherein the browser object container limits navigation through the content data within defined limits of the navigation options.

13. The system of claim 12, wherein the content data comprises a plurality of web pages, picture files, PDF documents and flash files.

14. The system of claim 12, wherein the content data is transmitted via one or more of network computer, email, PDA and mobile phone.

15. The system of claim 12, wherein the content data comprises a plurality of web pages from one or more web sites.

16. The system of claim 12, wherein a browser interface of the browser object container is defined by a user.

17. The system of claim 12, wherein multiple levels of encryption are assigned to content data for enabling multiple levels of access to the one or more recipients.

18. The system of claim 12, wherein at a recipient end of the one or more recipients, the system further comprises:
   a receiving means for receiving the browser object container containing the compressed and encrypted file;
   a decryption means for decrypting the encrypted file;
   a decompressing module for decompressing the compressed file; and
   a display means for viewing the content data via the browser object container as allowed by the navigation options.

19. The system of claim 12, wherein the content data comprises a plurality of embedded data files.

20. The system of claim 19, wherein the embedded data files comprises an entire website.

21. The system of claim 12, wherein the one or more recipients access web pages available on the Internet without an Internet connection.

22. An article of manufacture for implementing a browser object container, the article of manufacture comprising:
   at least one processor readable carrier; and
   instructions carried on the at least one carrier;
   wherein the instructions are configured to be readable from the at least one carrier by at least one processor and thereby cause the at least one processor to operate so as to:
   identifying content data for inclusion in a browser object container, wherein the browser object container comprises a graphical user interface development platform for providing a purpose-built Internet browser and wherein the browser object container comprises tagged data for enhancement integrity wherein at least one new feature identified by at least one new tag will not execute on an previous application;
   define one or more navigation options for defining how one or more recipients view the content data as provided by the browser object container;
   add the content data with the one or more navigation options to the browser object container wherein the content data and the one or more navigation options are embedded into a content definition;
   compress the content definition into a compressed file;
   encrypt the compressed file into an encrypted file for securing the content data; and
   electronically transmit the browser object container containing the compressed and encrypted file to the one or more recipients wherein the one or more recipients navigate through the content data as allowed by the one or more navigation options within the browser object container;
   wherein the browser object container is a stand-alone executable operating locally but giving an appearance of being connected to the Internet wherein the browser object container limits navigation through the content data within defined limits of the navigation options.

* * * * *